(12) United States Patent
Mizuno et al.

(10) Patent No.: US 8,154,643 B2
(45) Date of Patent: Apr. 10, 2012

(54) IMAGE PICK-UP APPARATUS, AN IMAGE PROCESSING APPARATUS AND AN IMAGE PROCESSING METHOD, FOR DISPLAYING IMAGE DATA ON AN EXTERNAL DISPLAY WITH APPROPRIATE COLOR SPACE CONVERSION BASED ON RESOLUTION OF IMAGE DATA AND EXTERNAL DISPLAY

(75) Inventors: Kimiyasu Mizuno, Akishima (JP); Jun Muraki, Hamura (JP); Koki Dobashi, Musashino (JP)

(73) Assignee: Casio Computer Co., Ltd., Tokyo (JP)

( * ) Notice: Subject to any disclaimer, the term of this patent is extended or adjusted under 35 U.S.C. 154(b) by 425 days.

(21) Appl. No.: 12/405,566

(22) Filed: Mar. 17, 2009

(65) Prior Publication Data

US 2009/0237525 A1 Sep. 24, 2009

(30) Foreign Application Priority Data

Mar. 19, 2008 (JP) .................. 2008-070730

(51) Int. Cl.
*H04N 5/222* (2006.01)
*H04N 7/01* (2006.01)
*H04N 11/20* (2006.01)
(52) U.S. Cl. ............... 348/333.01; 348/333.12; 348/455
(58) Field of Classification Search .................. None
See application file for complete search history.

(56) References Cited

U.S. PATENT DOCUMENTS

| | | | | |
|---|---|---|---|---|
| 6,020,920 A | * | 2/2000 | Anderson | 348/222.1 |
| 6,538,686 B2 | * | 3/2003 | Hara et al. | 348/14.12 |
| RE40,201 E | * | 4/2008 | Kim | 345/99 |
| 7,551,203 B2 | * | 6/2009 | Nakayama et al. | 348/222.1 |
| 7,719,572 B2 | * | 5/2010 | Tsujimura et al. | 348/220.1 |
| 2002/0088002 A1 | * | 7/2002 | Shintani et al. | 725/110 |
| 2004/0001156 A1 | | 1/2004 | Kazami et al. | |
| 2004/0150850 A1 | | 8/2004 | Hanamoto | |

(Continued)

FOREIGN PATENT DOCUMENTS

JP 8-502836 T 3/1996

(Continued)

OTHER PUBLICATIONS

Korean Office Action dated Feb. 17, 2011 (and English translation thereof) in counterpart Korean Application No. 10-2009-0021398.

(Continued)

*Primary Examiner* — Justin P Misleh

(74) *Attorney, Agent, or Firm* — Holtz, Holtz, Goodman & Chick, PC

(57) ABSTRACT

An image pick-up apparatus includes an image pick-up device, a storage media which stores an image picked up by the image pick up device, a color space converter which converts a color space of the image; a storage media reader which reads out the image from the storage media, an external display interface, a coefficient determiner which determines a coefficient for color conversion based on comparison between a resolution of the image read out by the storage media reader and a resolution of a display which is connected to the external display interface, and a display controller which outputs the image of which color is converted by the color space converter based on the coefficient for color conversion to the display.

10 Claims, 3 Drawing Sheets

U.S. PATENT DOCUMENTS

2005/0151853 A1* 7/2005 Suh .............................. 348/220.1
2005/0174457 A1* 8/2005 Yoshino et al. .......... 348/333.01

FOREIGN PATENT DOCUMENTS

| JP | 2003-018532 A | | 1/2003 |
|----|---------------|---|--------|
| JP | 2004-032564 A | | 1/2004 |
| JP | 2004-230827 A | | 8/2004 |
| JP | 2006-253984 A | | 9/2006 |
| JP | 2006287733 A | * | 10/2006 |
| JP | 2007-251891 A | | 9/2007 |

OTHER PUBLICATIONS

Japanese Office Action dated Feb. 2, 2010 and English translation thereof issued in a counterpart Japanese Application No. 2008-070730.

Japanese Office Action dated Aug. 24, 2010 and English translation thereof, issued in counterpart Japanese Application No. 2008-070730.

Japanese Office Action dated May 18, 2010 and English translation thereof in counterpart Japanese Application No. 2008-070730.

Chinese Office Action dated Jul. 26, 2010 and English translation thereof, in counterpart Chinese Application No. 200910127635.7.

Korean Office Action dated Aug. 24, 2010 and English translation thereof, in counterpart Korean Application No. 10-2009-0021398.

* cited by examiner

| RAW0 |
| RAW1 |
| RAW2 |
| RAW3 |
| RAW4 |
| RAW5 |
| RAW6 |
| RAW7 |
| RAW8 |
| RAW9 |

IMAGE PICK-UP APPARATUS, AN IMAGE PROCESSING APPARATUS AND AN IMAGE PROCESSING METHOD, FOR DISPLAYING IMAGE DATA ON AN EXTERNAL DISPLAY WITH APPROPRIATE COLOR SPACE CONVERSION BASED ON RESOLUTION OF IMAGE DATA AND EXTERNAL DISPLAY

CROSS-REFERENCE TO RELATED APPLICATIONS

This application is based on and claims the benefit of priority of Japanese Patent Application No. 2008-070730 filed on Mar. 19, 2008, the entire contents of which are incorporated herein by reference.

BACKGROUND OF THE INVENTION

1. Field of the Invention

This invention is related to an image pick-up apparatus, an image processing apparatus and an image processing method those display an image most appropriate color expression.

2. Description of Related Art

Recently, a camera which can take a High Definition (hereinafter: HD) movie has been developed. The camera can take an HD movie, a Standard Definition (hereinafter: SD) movie, a still image and a still image in a movie. On the other hand, a market of HD TV is growing, and a way to use the TV as a viewer for the movies and the still image has been proposed.

The digital camera uses several different color spaces, for example, ITU-R709 for an HD movie, ITU-R601 for an SD movie and a still image. Contrary, external display device also uses several different color spaces, for example in TV, ITU-R709 for HD expression, ITU-R601 for SD expression. Under such a situation, a converting process should be used in a slide-show including an HD movie, an SD movie and still images, according to both color spaces of the digital camera and the HD TV.

However, the movies and the images do not always include information which indicate their color space, and display devices do not always output information of color spaces currently in use. Therefore mismatch of color spaces often causes inappropriate color expression.

SUMMARY OF THE INVENTION

According to one aspect of the invention, an image pick-up apparatus includes: an image pick-up device; a storage media which stores an image picked up by the image pick up device; a color space converter which converts a color space of the image; a storage media reader which reads out the image from the storage media; an external display interface; a coefficient determiner which determines a coefficient for color conversion based on comparison between a resolution of the image read out by the storage media reader and a resolution of a display which is connected to the external display interface; a display controller which outputs the image of which color is converted by the color space converter based on the coefficient for color conversion to the display.

According to another aspect of the invention, an image processing apparatus includes: a storage media reader which reads out the image from the storage media; a color space converter which converts a color space of the image; an external display interface; a coefficient determiner which determines a coefficient for color conversion based on comparison between a resolution of the image read out by the storage media reader and a resolution of a display which is connected to the external display interface; a display controller which outputs the image of which color is converted by the color space converter based on the coefficient for color conversion to the display.

According to another aspect of the invention, an image processing method includes: reading out the image from the storage media; converting a color space of the image; determining a coefficient for color conversion based on comparison between a resolution of the image and a resolution of a display which is connected to the external display interface; outputting the image of which color is converted based on the coefficient for color conversion to the display.

DETAILED DESCRIPTION

The First Embodiment

Figures 1, 3:
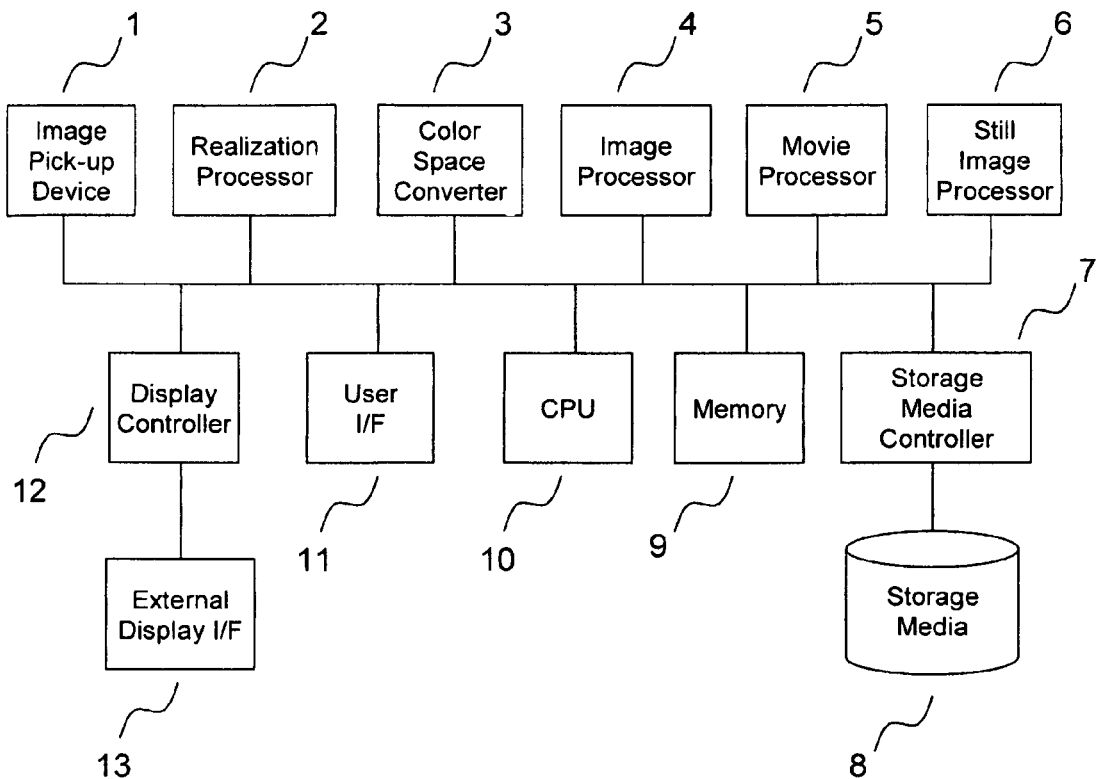
FIG. 1 is a block diagram of an image pick-up apparatus.
FIG. 3 illustrates a structure of an image buffer.

FIG. 1 is a block diagram illustrating a structure of an image pick-up apparatus according to a first embodiment to which the present invention is applied.

The image pick-up apparatus includes an image pick-up device 1, a realization processor 2, a color space converter 3, an image processor 4, a movie processor 5, a still image processor 6, a storage media controller 7, storage media 8, a memory 9, a CPU 10, user I/F 11, a display controller 12, and an external display I/F 13.

The image pick-up device 1 includes lenses, an image sensor, for example CCD or CMOS, which converts a subject image through the lenses to image signal. The image pick-up device 1 makes RAW (Bayer) data from the image signal with necessary corrections and stores to memory 9. The realization processor 2 converts RAW data stored in memory 9 to RGB data by executing realization and outputs the RGB data to the color space converter 3.

In a recording mode the color space converter 3 converts RGB data output from the realization processor 2 to YCbCr data and stored to the memory 9. In a play back mode, the color space converter 3 reads out YCbCr data from the memory 3 and outputs them to the display controller 12. The color space converter executes a color converting process such as ITU-R601 YCbCr to ITU-R709 YCrCb, or ITU-R709 YCbCr to ITU-R601 YCbCr.

The image processor 4 executes processing for size conversion and image adjustment etc. on a YCrCb data stored in memory 9 by the color space converter 3 and stores the processed data to the memory 9. In a recording mode, the movie processor 5 performs a compression process, for example MPEG, and stores compressed data to the memory 9. In the play back mode, the movie processor 5 reads out MPEG data from the memory 9, decompresses them to YCrCb movie data and stores them to the memory 9. In a recording mode, the still image processor 6 performs a compression process, for example JPEG, and stores compressed data to the memory 9. In the play back mode, the still image processor 6 reads out JPEG data from the memory 9, decompresses them to YCrCb still image data and stores them to the memory 9.

The storage media controller 7 controls read/write operations of MPEG, JPEG, or other data to the storage media 8.

CPU 10 controls the image pick up device 1 and the user I/F 11 which includes a shutter-key, movie-key, and other keys. The display controller 12 outputs video data and audio data to the external display, for example a TV, and obtains information of resolution and other characteristic through external display I/F 13, for example HDMI I/F. The display controller 12 informs the CPU 10 with a start timing of a blanking period in the video data which is output to the external display, for example a TV.

Figure 2:
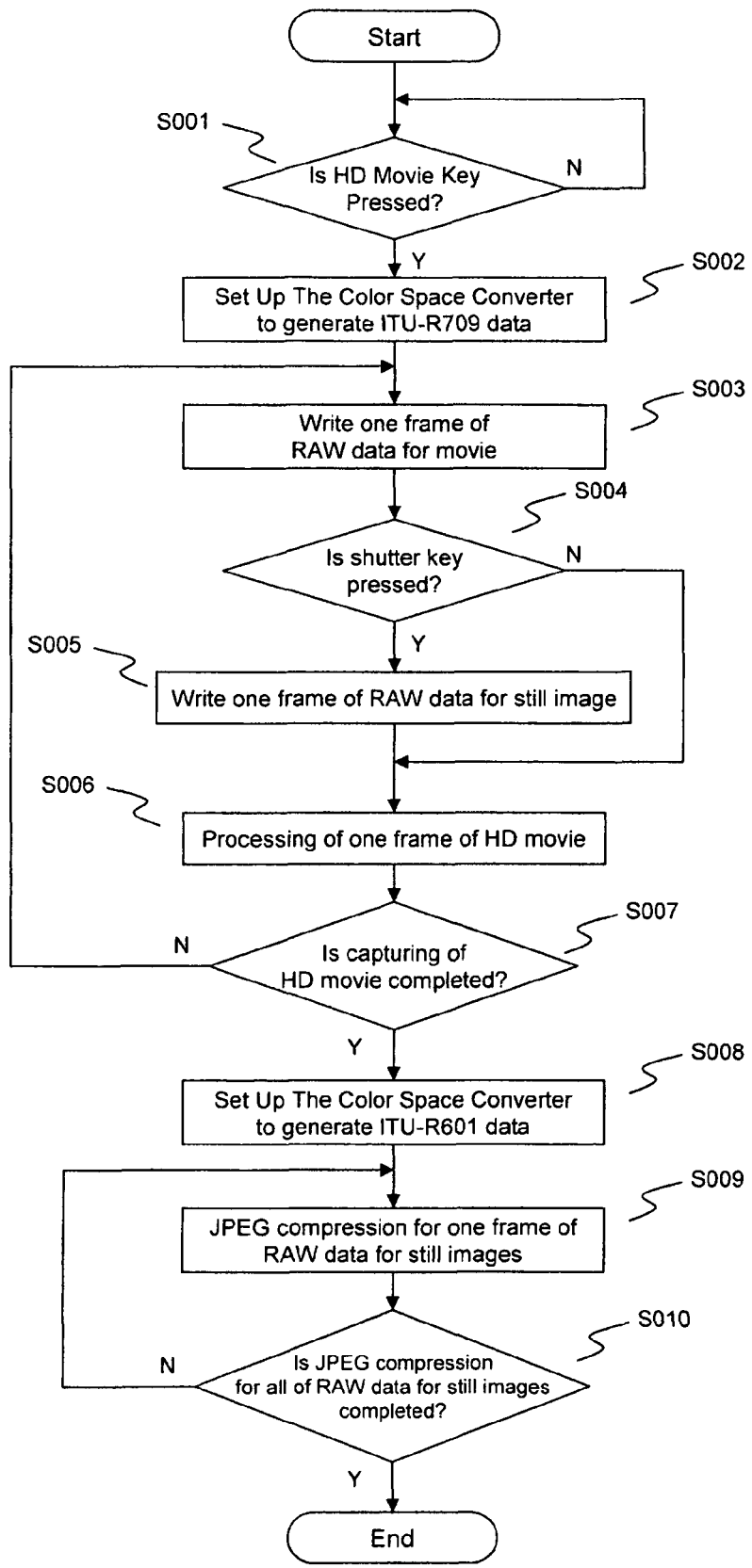
FIG. 2 is a flowchart of an image picking up process in the first embodiment.

Hereinafter, a process of picking up a still image in an HD movie capturing (Still-in HD movie) is explained with FIG. 2. A color space of HD movies is assumed as ITU-R709, and a color space for SD movies and still images is assumed as ITU-R601. After a detection of a pressing operation for HD movie key (not shown) by the user (step:S001), the CPU 10 sets up the color space converter 3 to generate ITU-R709 data (step:S002), and then instructs the image pick-up device 1, the realization processor 2, the color space converter 3, the image processor 4, the movie processor 5 and the storage media controller 7 to start an HD movie capturing. The image pick-up device 1 writes RAW data to the memory 9 every 1/30 second (step:S003). After a detection of a pressing operation for a shutter key (step:S004) the CPU 10 instructs the image pick-up device 1 to store RAW data for a still image. The image pick-up device 1 stores the RAW data for the still image in an area different from an area for a movie in the memory 9 (step:S005).

In the still-in HD movie mode, RAW data are stored in a buffer which has a structure of ten separated areas as RAW0 to RAW9 on the memory 9. An area of the structure can contain RAW data for one still image. In the still-in HD movie mode, the image pick-up device stores RAW data for still images sequentially to the areas shown in FIG. 3 in order RAW0, RAW1, RAW2..., according to instruction from the CPU 10. As shown in FIG. 3, the buffer can contain ten packages of RAW data for still images. Therefore the user can take ten still images in period from the beginning to the end of the HD movie capturing by the still-in HD movie operation CPU 10 watches amounts of stored RAW data for still image, and inhibits operation for still image capturing over ten.

After the recording of RAW data for still images, the realization processor 2 reads out RAW data for movies and converts them to RGB data.

The RGB data are sent to the color converter 3. The color converter 3 converts the RGB data to ITU-R709 YCbCr data, and send them to the image processor 4. The image processor 4 resizes the YCbCr data to a size for HD movie, applies adjustment processes to them, and stores the YCbCr data to the memory 9. The movie processor 5 reads out the YCbCr data, applies compression process of MPEG to them, and stores the compressed data to the memory 9 (step:S006).

When the user terminates HD movie capturing (step:S007), the CPU 10 waits for completion of MPEG data processing and storing of a final frame to the memory 9. After the completion of MPEG data processing, the CPU 10 sets up the color space converter 3 to generate data of which color space is ITU-R601, if more than one frame of RAW data for still image are stored in the memory 9 (step:S008). Then RAW data for still image picked up in movie capturing are converted to JPEG data (step:S009). The CPU 10 instructs the realization processor 2, the color converter 3, the image processor 4, the still image processor 6 and the storage media controller 7 to start processing of one frame of RAW data for JPEG conversion. In this process, the realization processor 2 is informed of the address of RAW0 area, shown in FIG. 3, in which RAW data for the still image is stored. The realization processor 2 reads out RAW data from RAW0 area and converts them to RGB data and sends the RGB data to the color space converter 3. The color space converter 3 converts the RGB data to ITU-R601 YCbCr data and sends the YCrCb data to the image processor 4. The image processor 4 resizes a frame size of the YCrCb data to a still image size and performs image tuning, and then writes the YCrCb data to the memory 9. The YCrCb data stored in the memory 9 is read out by the still image processor 6 and applied JPEG compression and restored to the memory 9. The storage media controller 7 reads out the compressed JPEG data from the memory 9 and records them to the storage media 8. By the above processing, one frame of still image capturing is completed.

The CPU 10 repeats process which converts RAW data for still images to JPEG data for all of them (step:S010). In this process, informed address to the realization processor 2 sequentially changed as RAW1, RAW2.... Processes of still images captured in still-in HD movie are completed when all of stored RAW data for still images are converted to JPEG data and the JPEG data are stored in the storage media 8 by the storage media controller 7. According to above process, both of processes for HD movie capturing and still-in HD movie are processed in appropriate color spaces.

The color space converter 3 is set up for ITU-R709 during HD movie capturing. If Still-in HD movie is executed in that period, the CPU 10 controls each processor to keep the RAW data for still images in the memory 9 until the capturing of HD movie is finished, to perform still image processing all of kept still image data with setting up the color space converter 3 to ITU-R601. As described above, both of a color space of HD movie and a color space of still-in HD movie are appropriately processed.

In the embodiment still images captured in Still-in HD movie are processed after finishing of HD movie capturing. But processing time required for one frame of movie is shorter than frame period, for example 1/30 second, still image processing may be performed in rest of frame period. In this case, the CPU 10 adapts the color space converter 3 to still images after completion of one frame of movie processing, then adapts the color space converter 3 to movie again before starting of movie processing of next frame after completion of still image processing. In this method, a number of frames available for Still-in HD movie is not limited by a buffer capacity, and improved usability on Still-in HD movie will be provided.

Figure 4:
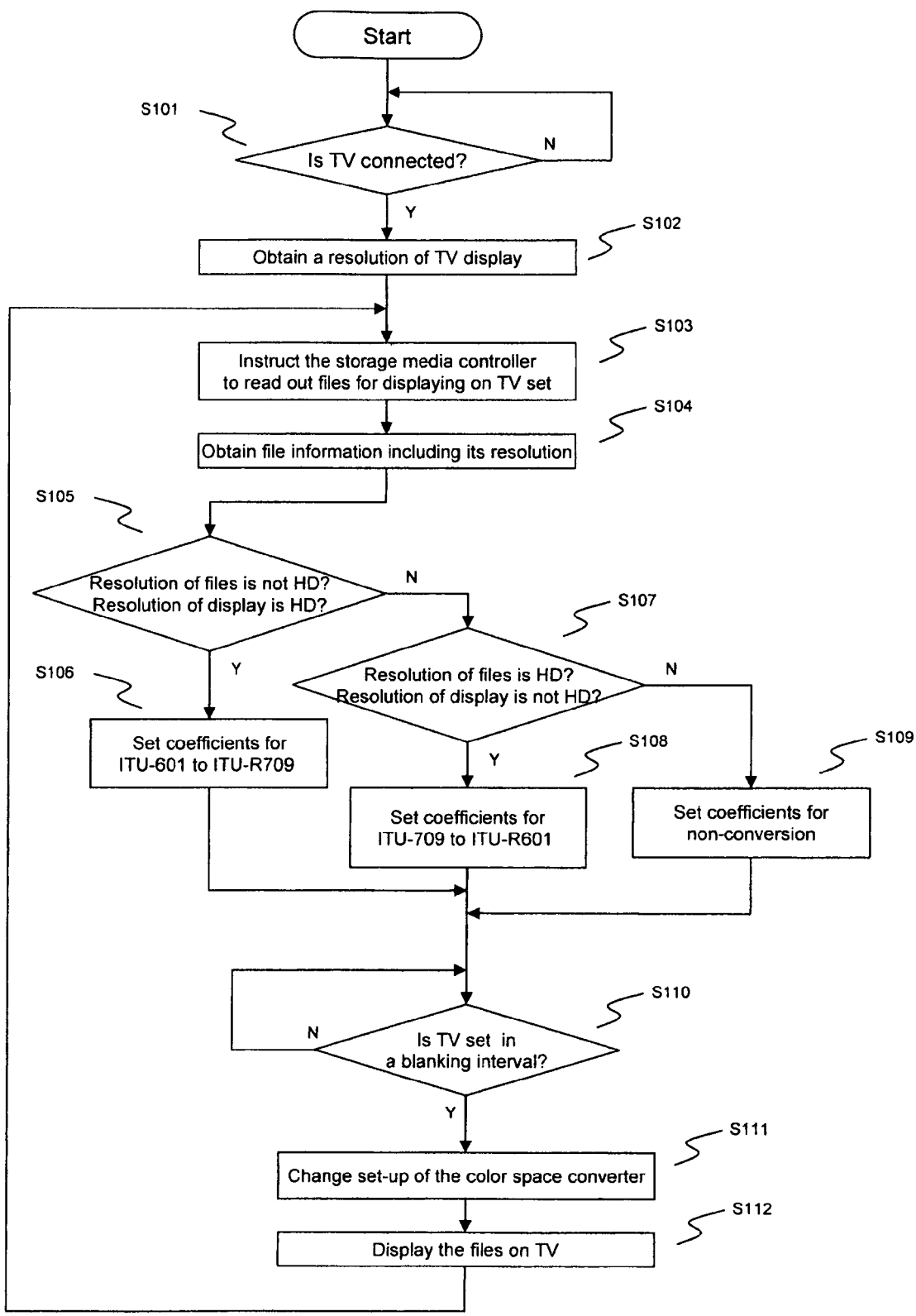
FIG. 4 is a flowchart of an image displaying process in the first embodiment.

A process of a slide-show which includes still images, HD movies and SD movies on the camera is explained with a flowchart in FIG. 4. Definition of the slide-show is a playback of still images, HD movies and SD movies according to predetermined order. The display controller 12 reports a connection of TV with a HDMI cable on the external display I/F 13 to the CPU 10, when the connection is detected (step:S101). The CPU 10 requests the display controller 12 to obtain resolution of the connected TV. The display controller 12 communicates with TV and obtains its resolution then reports the resolution to the CPU 10 (step:S102). The CPU 10 instructs the storage media controller to read out files for displaying on TV set, files such as MPEG files of HD and SD movies and JPEG files of still images, from the storage media 8 (step:S103). The storage media controller 7 reads out files designated by the CPU 10 from the storage media 8, and stores them to the memory 9.

The CPU 10 checks files stored in the memory 9 and obtains file information including its resolution (step:S104).

The CPU 10 determines whether or not the obtained resolution of the files and the obtained resolution of the display are satisfies "condition 1" (step:S105).

Condition 1: the obtained resolution of files is not HD and the obtained resolution of display is HD;

If the condition 1 is satisfied (Yes:S105), the CPU 10 sets up coefficients for conversion which converts ITU-601 to ITU-R709 to the color space converter 3 (step:S106). If the condition 1 is not satisfied (No:S105), the CPU 10 determines whether "condition 2" is satisfied or not (step:S107).

Condition 2: the obtained resolution of files is HD and the obtained resolution of display is not HD;

If the condition 2 is satisfied (Yes:S107), the CPU 10 sets up coefficients for conversion which converts ITU-709 to ITU-R601 to the color space converter 3 (step:S108). If the condition 2 is not satisfied (No:S107), the CPU 10 sets up coefficients which does not convert color space to the color space converter 3 (step:S109)

The CPU 10 determines whether the TV set is in a blanking interval or not, by receiving a blanking index from the display controller 12 (step:S110). If it is the blanking interval (Yes: S110), the CPU 10 changes set-up of the color space converter 3 (step:S111). If it is not the blanking interval (No: S110), the CPU 10 waits the blanking interval. The reason for waiting blanking interval is that a change of set-up in the color space converter 3 during a period in which valid image is output to the TV, the period is not the blanking interval, may cause a flicker or abnormal color.

After completion of the set-up change of the color space converter 3, the CPU 10 instructs the color space converter 3 and the display controller 12 to display playback images on the TV. The CPU 10 issues an instruction for displaying playback of images to the movie processor 5 when the stored files in the memory 9 are MPEG files for the HD movie, and to the still image processor 6 when the stored files are JPEG files for the still image.

In a case of movie playback, the movie processor 5 reads out MPEG data from files stored in the memory 9, and decompresses them to YCrCb data, then stores the YCrCb data to the memory 9. In a case of still image playback, the still image processor 6 reads out JPEG data from files stored in the memory 9, and decompresses them to YCrCb data, then stores the YCrCb data to the memory 9. The stored YCrCb data are read out by the color space converter 3 and applied a color space conversion according to above described set-up. The YCrCb data which is converted to suitable color space for the TV is output to the display controller 12. The display controller 12 outputs the YCrCB data to the TV with a TV signal (step:S112).

Above described processes are repeated, by returning step S103, after a predetermined time period passed. The predetermined time period, for a movie playback is corresponding to a frame period, for example 1/30 second. The predetermined time period for a still image playback is defined in slide-show setup, for example 3 seconds.

According to the embodiment, appropriate color spaces are applied to each process even in a capturing operation like a Still-in HD movie which includes different color spaces for a movie and a still image. Suitable color spaces are also applied in a slide-show which includes different color spaces for a movie and a still image, when the slide-show is displayed on the TV which has a plurality of color space. In the slide-show case, appropriate color space conversion is applied by referring resolutions of files to be displayed and TV display.

Color spaces used in the embodiment are ITU-R709 and ITU-R601, but the invention is not limited these color spaces. The slide-show which includes different color spaces is explained in the embodiment, but the invention may be applied to a case which displays images those color spaces are different each other. External display is not limited to TV, the invention may be applied to other display such as PC monitor.

A specific, embodiment of the present invention is explained with reference to the drawings. Note that the scope of the present invention is not limited to an illustrated example.

What is claimed is:

1. An image pick-up apparatus comprising:
   an image pick-up device;
   a storage media which stores an image picked up by the image pick up device;
   a storage media reader which reads out the image from the storage media;
   an external display interface which is connectable to a display;
   a coefficient determiner which determines a coefficient for color conversion based on a comparison between a resolution of the image read out by the storage media reader and a resolution of a display which is connected to the external display interface, wherein the coefficient determiner determines the coefficient as a first coefficient when the resolution of the image read out by the storage media reader is high definition, and determines the coefficient as a second coefficient when the resolution of image read out by the storage media reader is not high definition;
   a color space converter which converts a color space of the image read out by the storage media controller based on the coefficient for color conversion determined by the coefficient determiner; and
   a display controller which outputs the image with the color space converted by the color space converter.

2. The image pick-up apparatus according to claim 1, wherein the coefficient determiner determines the coefficient as the first coefficient when the resolution of the display which is connected to the external display interface is not high definition, and determines the coefficient as the second coefficient when the resolution of the display which is connected to the external display interface is high definition.

3. The image pick-up apparatus according to claim 2, wherein the first coefficient is a coefficient for color conversion from ITU-R709 to ITU-R601, and the second coefficient is a coefficient for color conversion from ITU-R601 to ITU-R709.

4. The image pick-up apparatus according to claim 1, wherein the color space converter performs a color conversion different from movie color conversion on an image picked up by the image pick-up device, and the storage media stores the converted image as a still image, when a predetermined operation by a user is detected during movie capturing.

5. An image processing apparatus comprising:
   a storage media reader which reads out an image from a storage media;
   an external display interface which is connectable to a display;
   a coefficient determiner which determines a coefficient for color conversion based on a comparison between a resolution of the image read out by the storage media reader and a resolution of a display which is connected to the external display interface, wherein the coefficient determiner determines the coefficient as a first coefficient when the resolution of the image read out by the storage media reader is high definition, and determines the coefficient as a second coefficient when the resolution of image read out by the storage media reader is not high definition;

a color space converter which converts a color space of the image read out by the storage media reader based on the coefficient determined by the coefficient determiner; and a display controller which outputs the image with the color space converted by the color space converter.

6. The image processing apparatus according to claim 5, wherein the coefficient determiner determines the coefficient as the first coefficient when the resolution of the display which is connected to the external display interface is not high definition, and determines the coefficient as the second coefficient when the resolution of the display which is connected to the external display interface is high definition.

7. The image processing apparatus according to claim 6, wherein the first coefficient is a coefficient for color conversion from ITU-R709 to ITU-R601, and the second coefficient is a coefficient for color conversion from ITU-R601 to ITU-R709.

8. An image processing method comprising:
reading out an image from a storage media;
determining a coefficient for color conversion based on a comparison between a resolution of the read out image and a resolution of a display which is connected to an external display interface, wherein the coefficient is determined as a first coefficient when the resolution of the read out image is high definition, and the coefficient is determined as a second coefficient different from the first coefficient when the resolution of the read out image is not high definition;
converting a color space of the read out image using the coefficient;
outputting the converted image.

9. The image processing method according to claim 8, wherein the coefficient is determined as the first coefficient when the resolution of the display which is connected to the external display interface is not high definition, and the coefficient is determined as the second coefficient when the resolution of the display which is connected to the external display interface is high definition.

10. The image processing method according to claim 9, wherein the first coefficient is a coefficient for color conversion from ITU-R709 to ITU-R601, and the second coefficient is a coefficient for color conversion from ITU-R601 to ITU-R709.

* * * * *